(12) United States Patent
Klarner (10) Patent No.: US 8,047,863 B2
(45) Date of Patent: *Nov. 1, 2011

(54) LOCKING MECHANISM FOR LOCKING A REMOVABLE DATA CARRIER

(75) Inventor: Harald Klarner, Filderstadt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/608,270

(22) Filed: Oct. 29, 2009

(65) Prior Publication Data

US 2010/0132183 A1    Jun. 3, 2010

Related U.S. Application Data

(62) Division of application No. 11/863,072, filed on Sep. 27, 2007, now Pat. No. 7,682,176.

(30) Foreign Application Priority Data

Sep. 27, 2006  (EP) ..................................... 06020280

(51) Int. Cl.
*B60R 25/10* (2006.01)

(52) U.S. Cl. ......... 439/304; 340/429; 180/287; 248/551

(58) Field of Classification Search ........................ None
See application file for complete search history.

(56) References Cited

U.S. PATENT DOCUMENTS

| 4,471,852 | A   | * | 9/1984  | Schield et al. ................. 180/287 |
| 5,524,859 | A   | * | 6/1996  | Squires et al. ................. 248/551 |
| 5,598,142 | A   | * | 1/1997  | Winner, Jr. ..................... 340/438 |
| 6,822,558 | B1  | * | 11/2004 | Haderer ...................... 340/426.1 |
| 7,007,996 | B2  | * | 3/2006  | Lee et al. ...................... 296/37.8 |
| 2004/0232233 | A1 |  | 11/2004 | Boldt et al. |

FOREIGN PATENT DOCUMENTS

| DE | 10131216 A1 | 1/2003 |
| EP | 1422108 A1  | 5/2004 |
| JP | 02304367    | 12/1990 |

* cited by examiner

*Primary Examiner* — Truc T Nguyen
(74) *Attorney, Agent, or Firm* — The Eclipse Group LLP (57) ABSTRACT

A locking mechanism is provided for locking a removable data carrier in a support structure of an electronic device. The locking mechanism includes a movable locking element, indicating unit and a locking element control unit. The movable locking element is movable between a locked position and an unlocked position, where the locking element, in its locked position, prevents the removal of the data carrier from the support structure.

6 Claims, 7 Drawing Sheets

LOCKING MECHANISM FOR LOCKING A REMOVABLE DATA CARRIER

CROSS-REFERENCE TO RELATED APPLICATIONS

This application is a divisional of U.S. patent application Ser. No. 11/863,072, filed Sep. 27, 2007, now U.S. Pat. No. 7,682,176 titled LOCKING MECHANISM FOR LOCKING A REMOVABLE DATA CARRIER, which application is incorporated by reference in this application in its entirety.

RELATED APPLICATIONS

This application claims priority of European Patent Application Serial Number 06 020 280.1 filed, Sep. 27, 2006, titled LOCKING MECHANISM FOR LOCKING A REMOVABLE DATA CARRIER, which application is incorporated in its entirety by reference in this application.

BACKGROUND OF THE INVENTION

1. Field of the Invention

The present invention relates to a mechanism and a method for locking a removable data carrier in a support structure of an electronic device.

2. Related Art

In modern car radio systems, car entertainment systems, navigation systems, and hands-free speaking systems for vehicles, there are slots for receiving memory cards or the like for providing, for example, music or videos for a car radio system or a car entertainment system, electronic maps for a car navigation system, subscriber identification information on a SIM (subscriber identity module) card for hands-free speaking systems, or a CA module (condition access module) for a car entertainment system for receiving protected audio or video sources. These data carriers, for example, memory cards, SIM cards, or CA modules, are usually inserted via a slot in the front plate of an electronic device provided in the vehicle, for example, a car radio system, a car navigation system, a car entertainment system, or a hands-free speaking system. These data carriers are very valuable due to the cost of the data carrier itself, be it a memory card with several GB capacities, or be it due to the content stored on the data carrier, especially in the case of a SIM card or a CA module.

As these data carriers are easily accessible and removable from the electronic device as they should be easily exchangeable by the user, these data carriers are also easily removable by an unauthorized person breaking into the vehicle and stealing the data carrier. Therefore, a need exists for a data carrier that can be locked into electronic devices and removable only by authorized persons.

SUMMARY

A locking mechanism is provided for locking a removable data carrier in a support structure of an electronic device, such as an electronic device for use in a vehicle. The locking mechanism includes a movable locking element, an indicating unit, and a locking element control unit. The movable locking element is movable between a locked position and an unlocked position, where the locking element, in its locked position, prevents the removal of the data carrier from the support structure. The indicating unit indicates that a locking of the removable data carrier is required and the locking element control unit controls the position of the locking element. When the indicating unit indicates that a locking of the removable data carrier is required, the locking element control unit moves the locking element to its locked position.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the following, various examples of implementations of the invention will be described in detail. It is to be understood that the following description is given only for the purpose of illustrating the principles of the invention and is not to be taken in a limiting sense. Rather, the scope of the invention is defined only by the appended claims and is not intended to be limited by the described examples.

Figure 1:
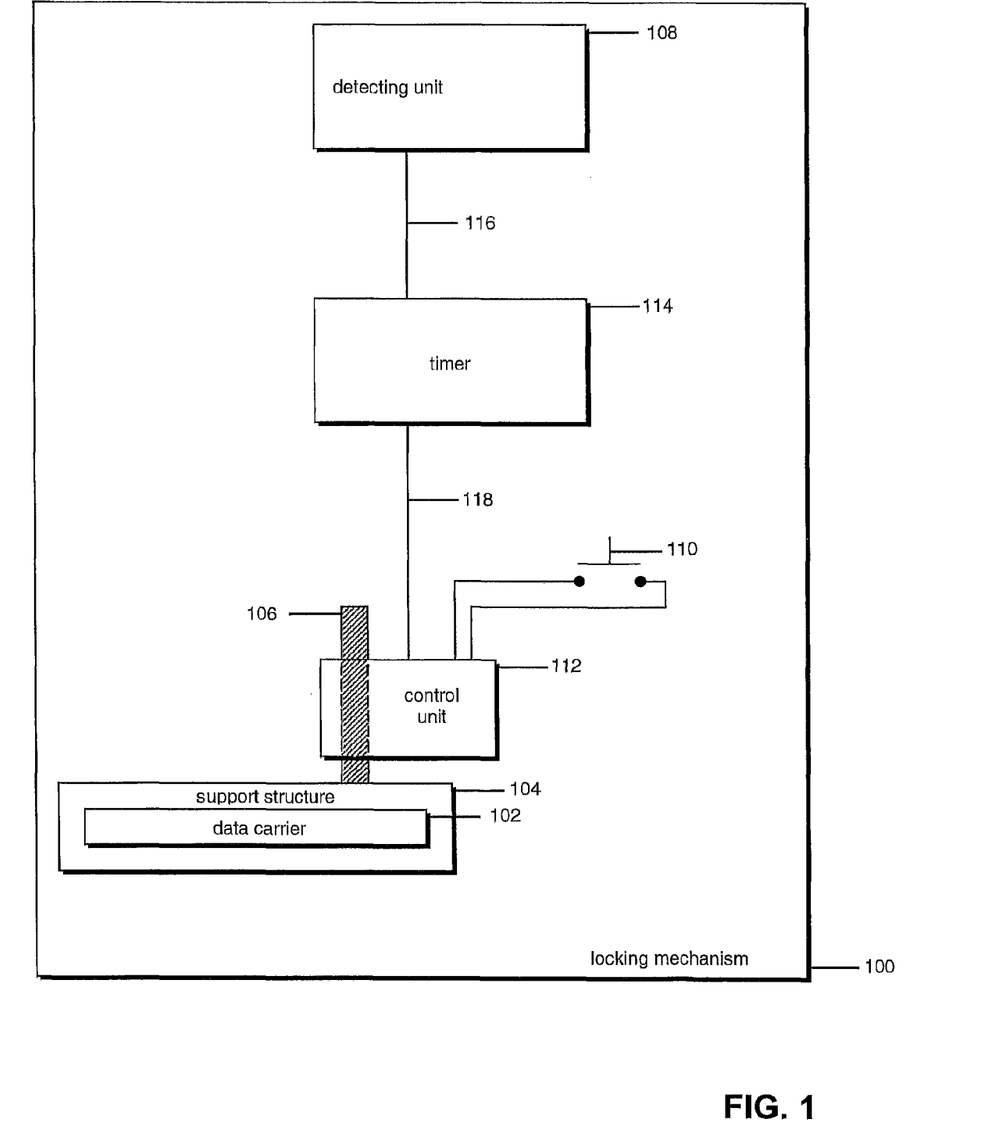
FIG. 1 is a schematic diagram showing the components of one example of an implementation of a locking mechanism according to the invention.

FIG. 1 shows a schematic diagram of a locking mechanism 100 for locking a removable data carrier 102 in a support structure 104 of an electronic device 200 (FIG. 2), such as an electronic device provided in a vehicle. The locking mechanism 100 includes a movable locking element 106, which is moveable between a locked position and an unlocked position, where the locking element 106 prevents, in its locked position, the removal of the data carrier 102 from the support structure 104.

Furthermore, the locking mechanism 100, when utilized in connection with an electronic device provided in a vehicle, may include an ignition status detecting unit 108 for detecting whether the ignition of the vehicle is switched on or off, a user operable switch 110, and a locking element control unit 112 controlling the position of the locking element 106, where the locking element control unit 112 moves the locking element 106 to its locked position when the ignition status detecting unit 108 detects that the ignition is switched off. Further, the locking mechanism 106, according to one implementation, may include a timer 114 for delaying the movement of the locking element 106 for a predetermined period of time after detecting that the ignition is switched off. As can be seen in FIG. 1, the ignition status detecting unit 108 is connected via the timer 114 with the locking element control unit 112, which controls the locking element 106.

Figure 3A:
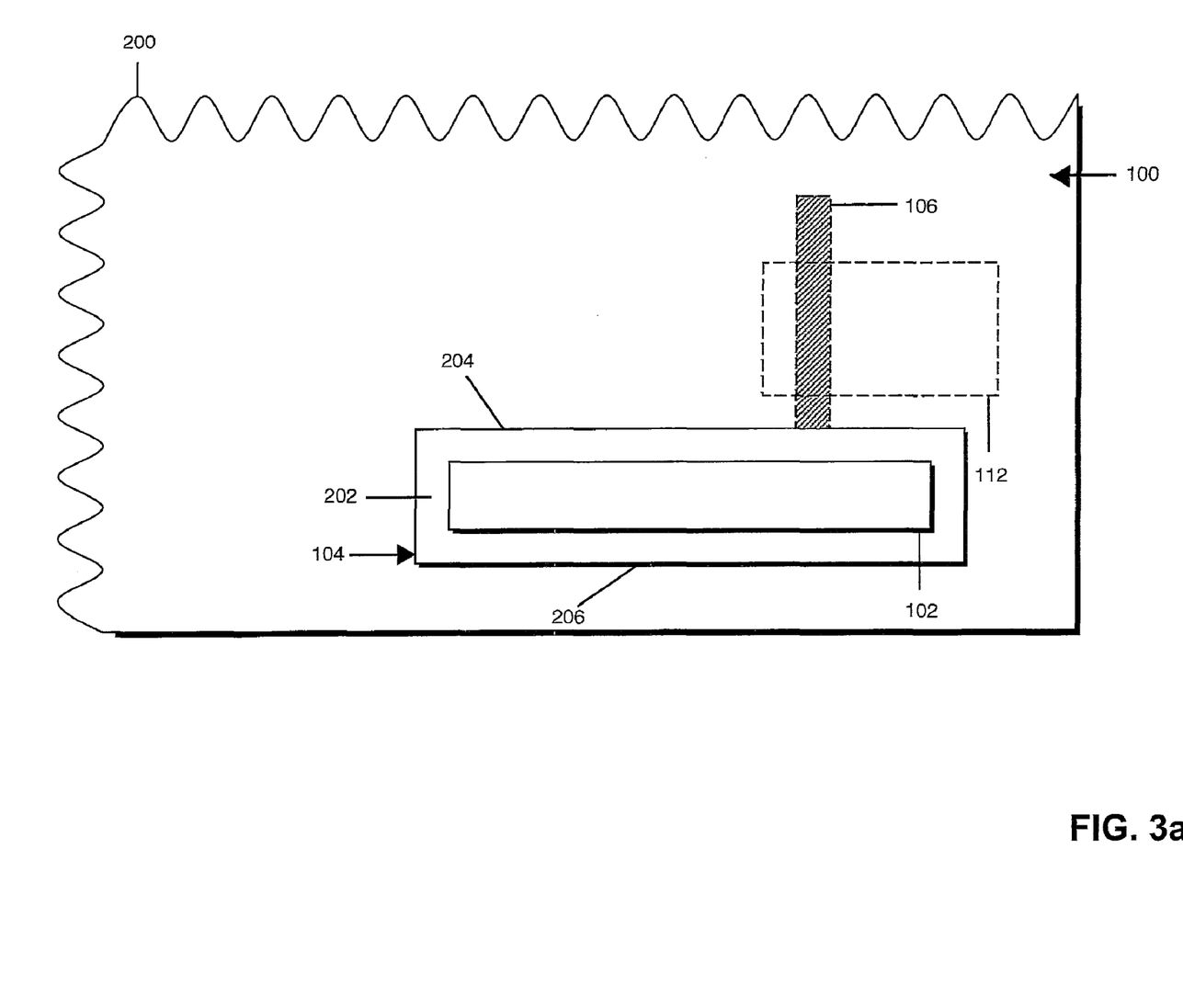
FIG. 3a shows one example of an implementation of a locking mechanism where the locking element comprises a bolt and the bolt is positioned in an unlocked position.
Figure 3B:
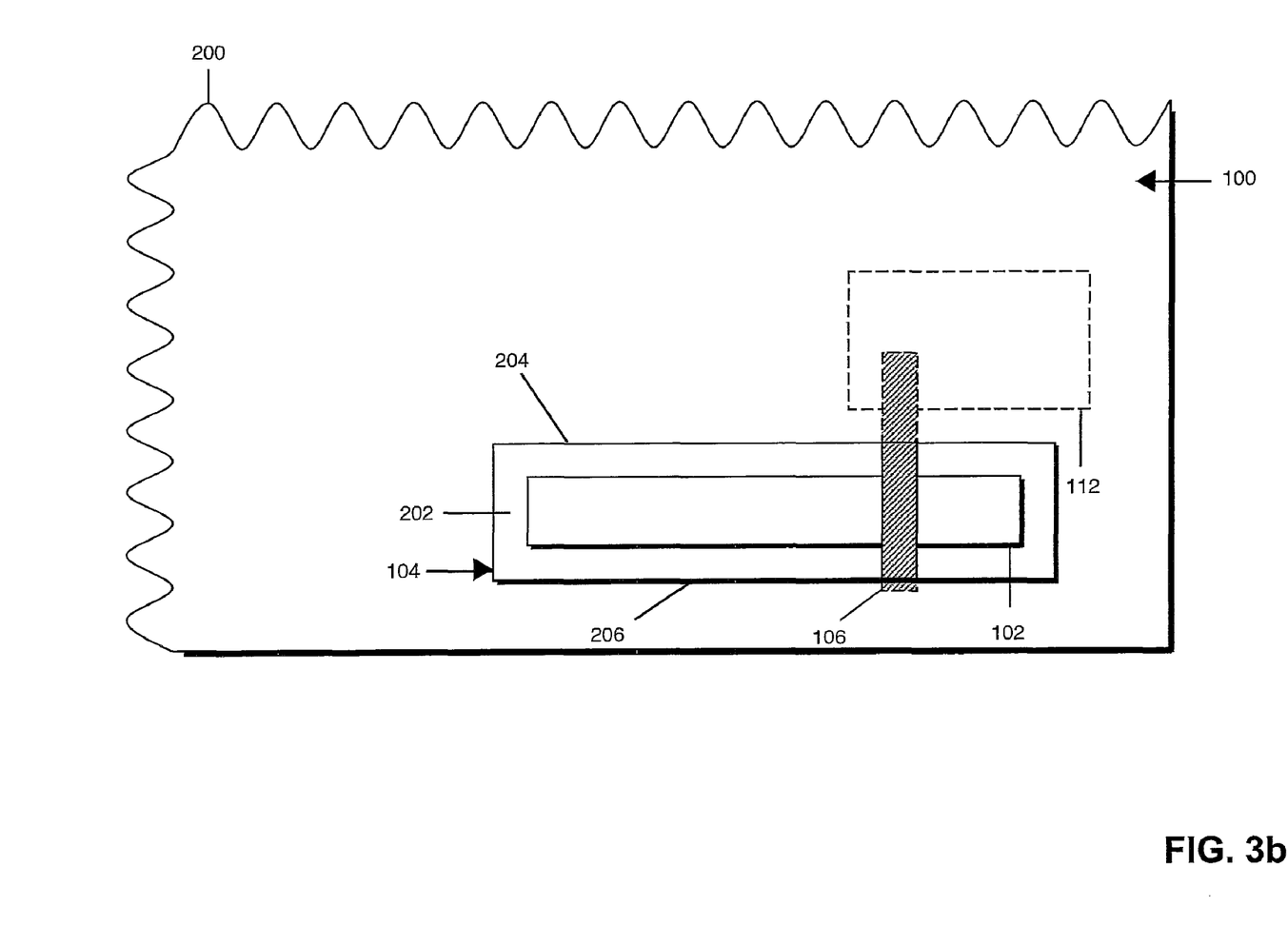
FIG. 3b shows the locking mechanism of FIG. 3a where the bolt is positioned in a locked position.

Upon detection that the ignition is switched off by the ignition status detecting unit 108, a signal is sent to the timer 114 via connection 116. Timer 114 delays the signal received from the ignition status detecting unit 108 for a predetermined period of time, for example 30 seconds, and then sends the signal indicating that the ignition is switched off via connection 118 to the locking element control unit 112. After receiving the signal that the ignition is switched off, the locking element control unit 112 moves the locking element 106 from its unlocked position, which is indicated in FIG. 1, to its locked position, as will be described later in connection with FIG. 3. In its locked position, the locking element 106 prevents the removal of the data carrier 102 from the support structure 104. Alternatively, upon operating the user operable switch 110, the locking element control unit 112 moves the locking element 106 from its unlocked position, which is indicated in FIG. 1, to its locked position, as will be described later in connection with FIG. 3.

Upon detection that the ignition is switched on, the ignition status detecting unit 108 sends a signal indicating that the ignition is switched on via connection 116 to the timer 114. In this case, the timer 114 directly, without delaying the signal for a predetermined period of time, sends a signal indicating that the ignition is switched on to the locking element control unit 112 via the connection 118. The locking element control unit 112 then moves the locking element 106 from its locked position to its unlocked position, which enables the removal of the data carrier 102 from the support structure 104. Additionally, or alternatively, an operating of the switch 110 may be required before the locking element 106 is moved from its locked position to its unlocked position.

The locking mechanism 100 of FIG. 1 enables a reliable protection against a removal of the data carrier 102 from the support structure 104 by an unauthorized person when the ignition of the vehicle is switched off, in which the electronic device containing the data carrier 102 in the support structure 104 is provided. The timer 114 enables the authorized user of the car and the electronic device to remove the data carrier 102 even if the ignition is switched off for a predetermined period of time, thus avoiding that the user has to let the engine run until the removable data carrier is removed if the user wants to leave the vehicle and take the removable data carrier 102 with him/her. On the other hand, the removable data carrier 102 may always be removable having switched on the ignition of the vehicle and/or operating the switch 110.

For purposes of this application, the ignition status detecting unit 108 and the user operable switch 110 may both be referred to as an indicating unit, as well as any other type of detecting unit that may indicate when the locking element control unit 112 locks or unlocks the locking element 106. As such, the indicating unit will indicate to the locking element control unit 112 how to control the position of the locking element 106. Thus, when the indicating unit is an ignition status detecting unit 108, the locking element control unit 112 will move the locking element 106 to its locked position when the ignition status detecting unit 108 detects that the ignition is switched off. Further, for example, when the indicating unit is an operable switch 110, the locking element control unit 112 will move the locking element 106 to its locked position when the switch is manually operated to indicate that the locking element 106 should be locked. Likewise, the locking element control unit 112 will move the locking element 106 into its unlocked position when the switch is manually operated to indicate that the locking element 106 should be unlocked.

Figure 2:
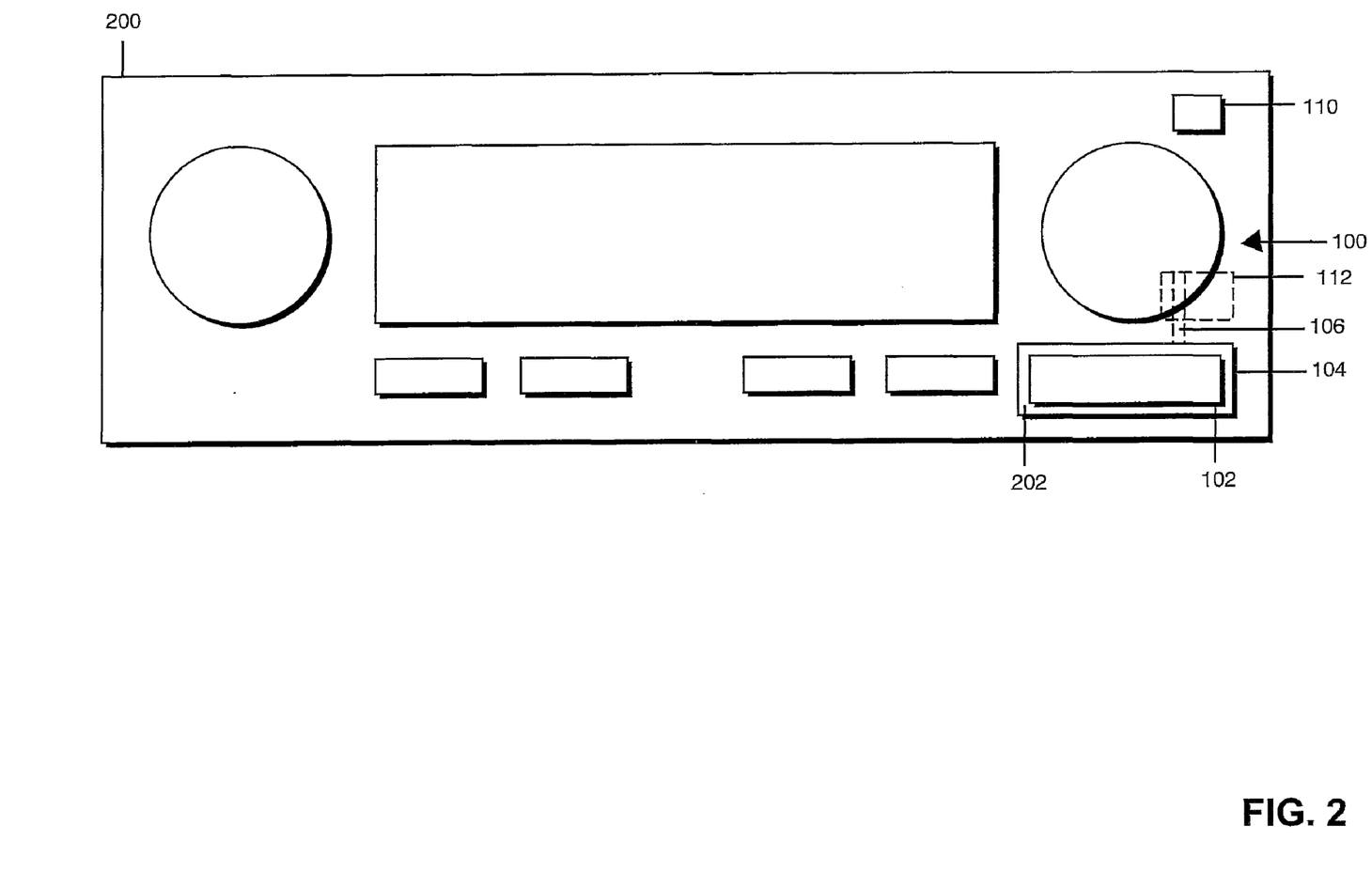
FIG. 2 is a schematic view of an electronic device containing a support structure for a removable data carrier.

FIG. 2 shows an electronic device 200 including a locking mechanism 100 of FIG. 1. The electronic device 200 may be a vehicle radio system, a vehicle navigation system, a vehicle entertainment system, or a hands-free speaking system in the vehicle. As shown in FIG. 2, the locking mechanism 100 may include a moveable locking element 106 moveable between a locked position and an unlocked position, where the locking element 106, in its locked position, prevents the removal of the data carrier 102 from the support structure 104, ignition status detecting unit 108 (FIG. 1), a switch 110 that is located on a front plate of the electronic device which may be removable by a quick fastening system by the user, and a locking element control unit 112 controlling the position of the locking element 106. The locking element 106, in its locked position, is positioned such that an opening 202, through which the data carrier 102 removable from the support structure 104, is at least partly blocked.

In FIG. 2, the locking element 106 includes a bolt which, in its locked position, protrudes from an edge of the opening 202 in a direction inwardly of the opening 202 and substantially in parallel with a plane defined by the edge of the opening. This will be described in more detail in connection with FIG. 3. The opening 202 shown in FIG. 2 has a slot-like shape, but is not restricted to a slot-like shape and may have any shape required for inserting and removing the removable data carrier 102. The removable data carrier 102 may be a memory card providing, for example, music or videos or map information or a vehicle radio system, a vehicle entertainment system or a vehicle navigation system, or may be a SIM (subscriber identity module) card for a hands-free speaking system in a vehicle or a hands-free speaking system integrated in a vehicle radio system, or a CA (condition access) module for a vehicle radio system or a vehicle entertainment system for providing access to radio or TV data sources.

FIG. 3 is a cut away view of the electronic device 200 of FIG. 2, illustrating the locking mechanism 100. FIG. 3a shows the locking mechanism 100 with the locking element 106 in the unlocked position. FIG. 3b shows the locking mechanism 100 with the locking element 106 in a locked position.

In the implementation illustrated in FIG. 3a & FIG. 3b, the locking element 106 of the locking mechanism 100 is a bolt that is moveable from its unlocked position, as shown in FIG. 3a, to its locked position shown in FIG. 3b, and vice versa. The locking element control unit 116 moves, upon reception of a signal from the ignition status detecting unit 108 (FIG. 1) indicating that the ignition of the vehicle is switched off, the locking element 106 from its unlocked position, as shown in FIG. 3a, to its locked position as shown in FIG. 3b. The bolt extends substantially in parallel with a plane defined by the edge of the opening 202 of the support structure 104. In its locked position, the bolt extends from a first edge 204 of the opening 202 to a second edge 206 opposing the first edge 204 of the opening 202. In its extended position, the bolt prevents the removal of the data carrier 102 from the support structure 104 through the opening 202.

Figure 4A:
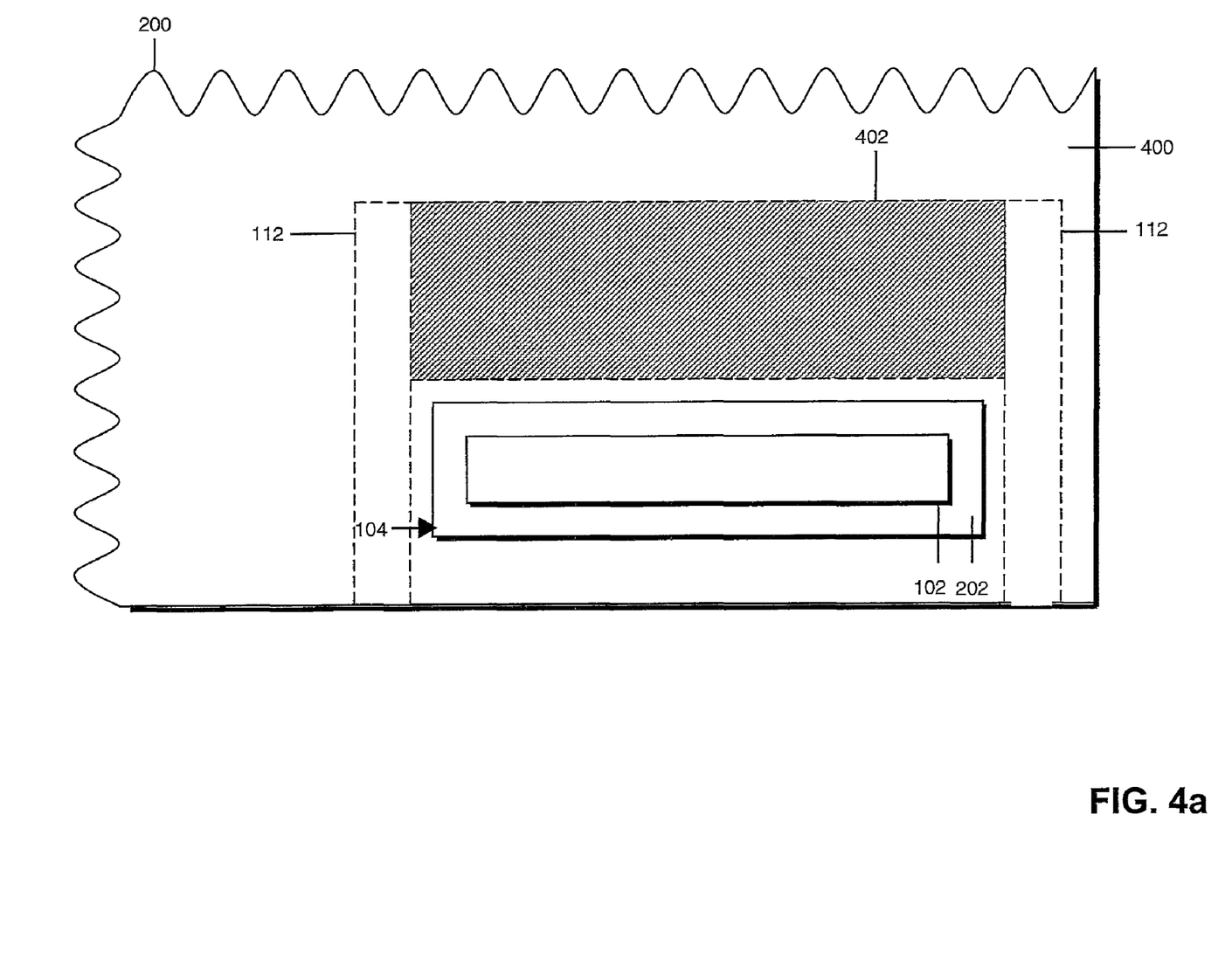
FIG. 4a shows another example of an implementation of a locking mechanism where the locking element comprises a flap and the flap is positioned in an unlocked position.
Figure 4B:
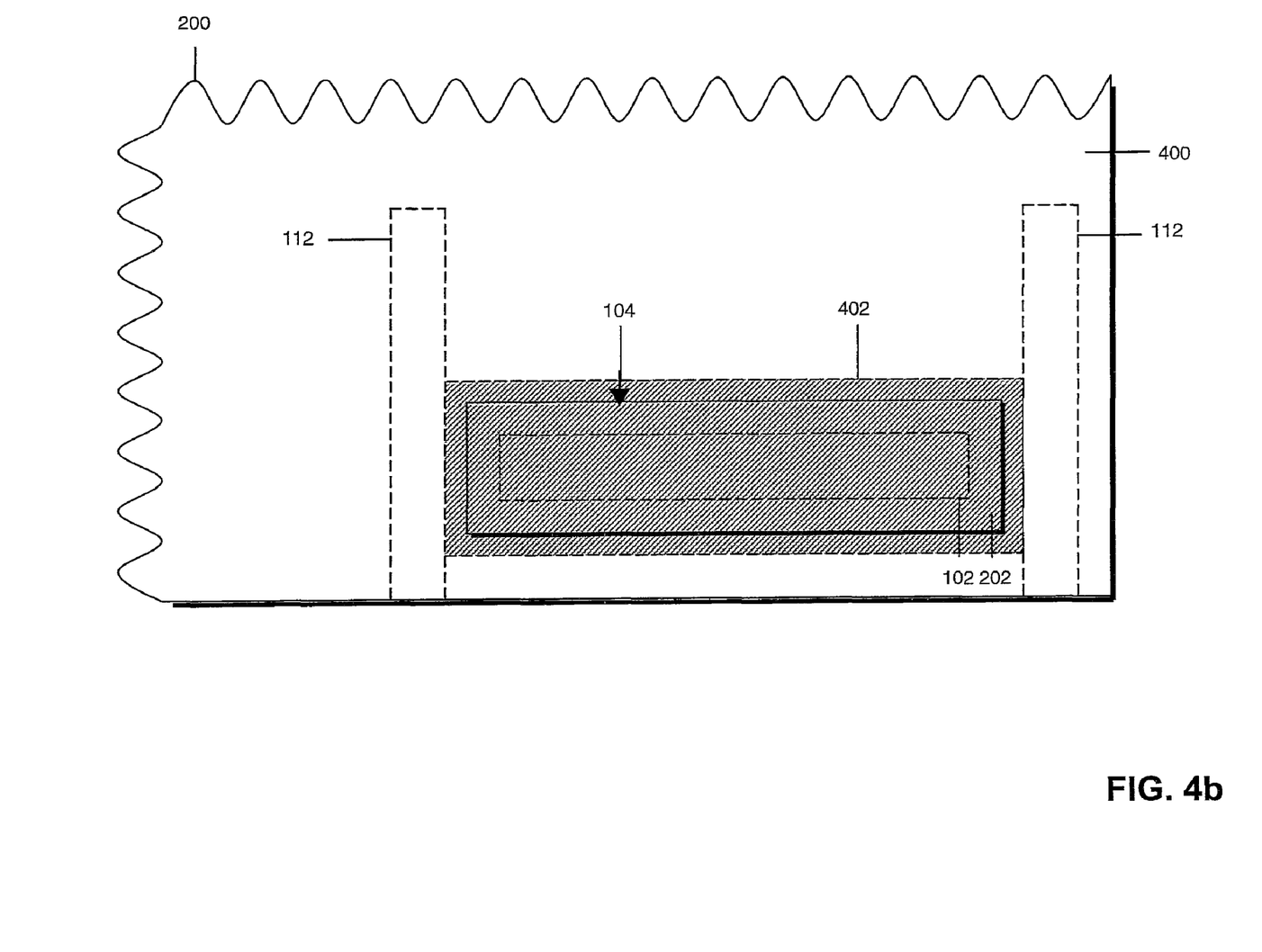
FIG. 4b shows the locking mechanism of FIG. 4a where the flap is positioned in a locked position.

FIG. 4 is a cut away view of the electronic device 200 of FIG. 2 illustrating another example of an implementation of a locking mechanism 400, where the locking element 402 is a flap or cover. FIG. 4a shows the locking mechanism 400 with the locking element 402 in the unlocked position. FIG. 4b shows the locking mechanism 400 with the locking element 402 in a locked position.

FIGS. 4a and 4b illustrate another example of an implementation of the locking mechanism 400 where the locking element 402 is a flap or cover, which, in its locked position, covers at least part of the opening 202. The locking element control unit 112 controls the position of the locking element 402. In its unlocked position, as shown in FIG. 4a, the flap 402 does not cover the opening 202 and therefore the data carrier 102 can be removed from or inserted into the support structure 104 of the electronic device 200. In its locked position, the locking element 402 blocks at least part or, as shown in FIG. 4b, all of the opening 202 of the support structure 104. Therefore, in this locked position, the flap, which comprises the locking element 402, prevents the removal of the data carrier 102 from the support structure 104. Furthermore, the flap, in its locked position, may hide the opening 202 of the support structure 104 such that the support structure 104 and the data carrier 102 are not visible, when the ignition is switched off and/or the switch is operated. The locking element control unit 112 controls the position of the flap 402 upon signals received from the ignition status detecting unit 108 (FIG. 1) or the switch 110 (FIGS. 1 & 2) as described above.

Figure 5:
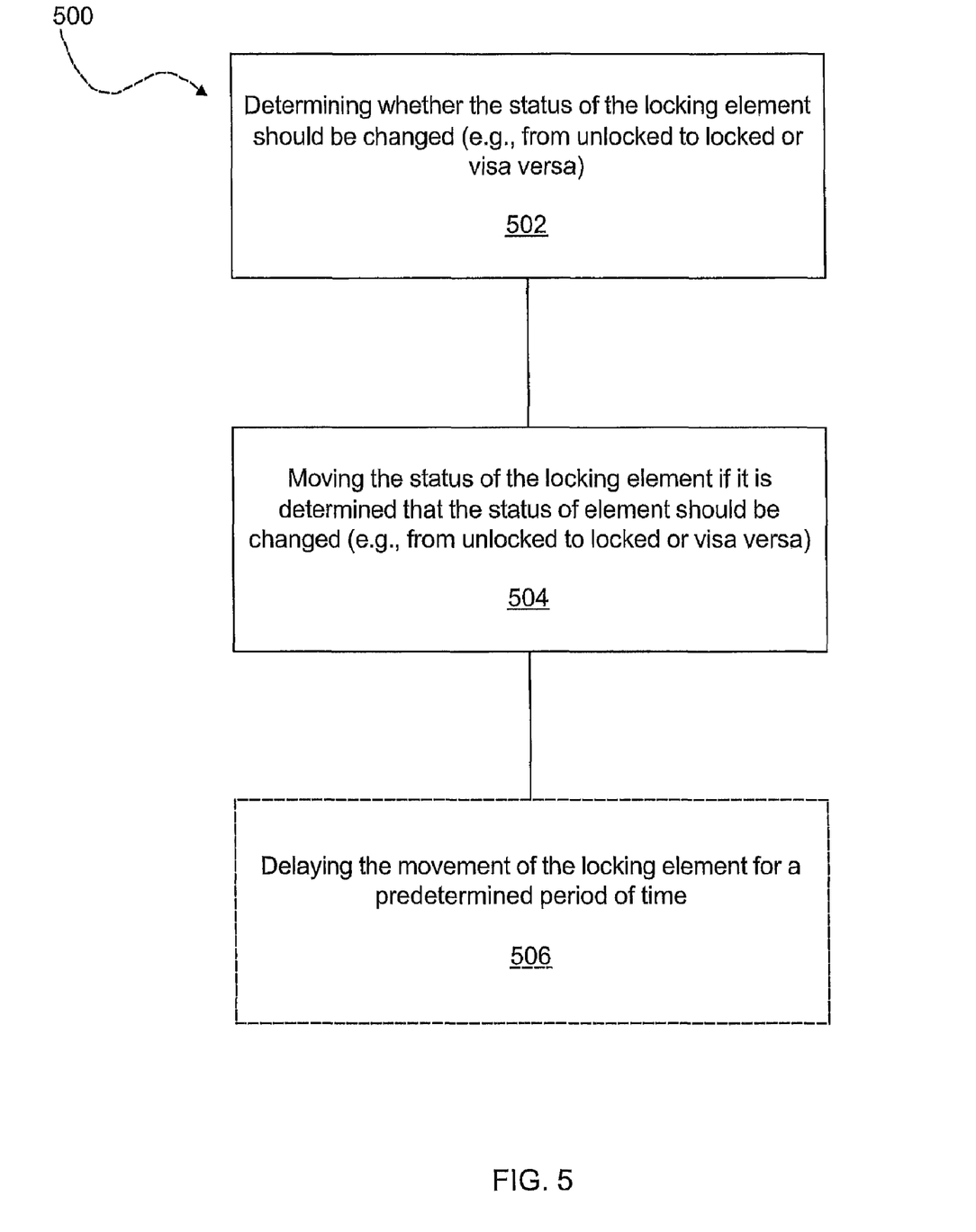
FIG. 5 illustrates one example of a method for locking a removable data carrier in a support structure of an electronic device.

FIG. 5 illustrates one example of a method 500 for locking a removable data carrier in a support structure of an electronic device. As illustrated at step 502, the method first determine whether the locking mechanism should be locked or unlocked, this may be done by indicating that a locking or unlocking of the removable data carrier is required, e.g., through detecting that the ignition of the vehicle is switched off or on, or through the operation of a user operable switch. At step 504, upon indication that the locking or unlocking of the removable data carrier is required, a moveable locking element, which is moveable between a locked position and an unlocked position, is moved to either the locked or unlocked position as determined by the indicating unit. In its locked position, the locking element prevents the removal of the data carrier from the support structure. For example, the method may include, upon detecting that the ignition of the vehicle is switched on, an unlocking of the removable data carrier in the electronic device by moving the locking element to its unlocked position.

Additionally, the method may further include the step 506 of, delaying the movement of the locking element to its locked position for a predetermined period of time, for example, for a period of time after the vehicle ignition is shut off. This delay may then allow the user the time to remove the data carrier once the vehicle ignition is off before the locking mechanism moves the locking element to the locked position.

While the above described locking mechanism for locking a removable data carrier is described in connection with an electronic device provided in a vehicle. The locking mechanism may be utilized in any electronic device capable of receiving a removable data carrier. The locking mechanism including a movable locking element moveable between a locked position and an unlocked position. Furthermore, the locking mechanism comprises indicating unit indicating that a locking of the removable data carrier is required, and a locking element control unit controlling the position of the locking element. When the indicating unit indicates that a locking of the removable data carrier is required, the locking element control unit moves the locking element to its locked position.

As the locking element can be moved to the locked position upon detecting that the ignition of the vehicle is switched off, the data carrier is protected against a removal by an unauthorized person without further interaction of the user of the vehicle in which the electronic device is installed in which the data carrier is inserted. Since, in certain embodiments, no additional interaction may be needed by the user of the vehicle for locking the removable data carrier, a very high degree of protection against the removal of the data carrier by an unauthorized person may be offered.

As the locking element can be moved to the locked position upon operation of a switch, which may be located on a removable front plate of the electronic device, the data carrier may also be protected against a removal by an unauthorized person in that the switch is operated to lock the removable data carrier. Further, the removable front plate may be removed by the authorized user from the electronic device upon leaving the vehicle. This provides, e.g., a theft protection in case no ignition detecting units are available connecting the electronic device with the vehicle, or in case the vehicle is left in a served parking lot or a garage, where the vehicle keys are left together with the car.

According to another example, the removable data carrier may be insertable and removable into and from the support structure via an opening facing the passenger compartment. The locking element may be positioned, in its locked position, such that the opening through which the data carrier is removable from the support structure is at least partly blocked. Such a locking mechanism may be easy to design and reliable in working operation, and therefore provide reliable protection against an unauthorized removal of the data carrier.

Additionally, the locking mechanism may further include a timer that delays the movement of the locking element to the locked position for a predetermined period of time after detecting that the ignition is switched off. This enables the user of the vehicle utilizing the electronic device with the removable data carrier to remove the removable data carrier after having e.g., switched off the ignition for a predetermined period of time. Therefore, when leaving the car, the user does not need to let the engine run until he or she has removed the removable data carrier. This provides a saving of energy and increases the comfort for the user.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for locking a removable data carrier in a support structure of an electronic device provided in a vehicle, comprising the steps of:
   detecting a switching off of an ignition of the vehicle indicating that a locking of the removable data carrier is required,
   providing a timed period to allow removal of the removable data carrier after switching off the ignition of the vehicle, and
   subsequently moving a locking element to a locked position from an unlocked position, the movement of the locking element to the locked position preventing removal of the removable data carrier from the support structure if the removable data carrier has not already been removed.

2. The method of claim 1, further comprising the step of unlocking of the removable data carrier in the electronic device by moving the locking element to its unlocked position upon detecting that the ignition of the vehicle is switched on.

3. The method of claim 1, further comprising the step of unlocking of the removable data carrier in the electronic device by moving the locking element to its unlocked position upon operation of a user operable switch, independent of a vehicle ignition switch.

4. A method for locking a removable data carrier in a support structure of an electronic device provided in a vehicle, comprising the steps of:
   indicating that a locking of the removable data carrier is required, through an operation of a user operable switch, independent of a vehicle ignition switch, and
   moving a locking element from an unlocked position to a locked position preventing the removal of the removable data carrier from the support structure.

5. The method of claim 4, further comprising the step of unlocking of the removable data carrier in the electronic device by moving the locking element to its unlocked position upon operation of the user operable switch, independent of a vehicle ignition switch.

6. The method of claim 4, further comprising the step of unlocking of the removable data carrier in the electronic device by moving the locking element to its unlocked position upon detecting that an ignition of the vehicle is switched on.

* * * * *